(12) United States Patent  (10) Patent No.: US 6,705,362 B2
Pisot  (45) Date of Patent: Mar. 16, 2004

(54) VALVE ASSEMBLY WITH OR WITHOUT INTEGRATED REDUCER FOR PRESSURIZED GAS CONTAINER

(75) Inventor: Philippe Pisot, L'Isle Adam (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 13 days.

(21) Appl. No.: 10/240,612
(22) PCT Filed: Mar. 23, 2001
(86) PCT No.: PCT/FR01/00892
 § 371 (c)(1),
 (2), (4) Date: Sep. 30, 2002
(87) PCT Pub. No.: WO01/75355
 PCT Pub. Date: Oct. 11, 2001

(65) Prior Publication Data
 US 2003/0047237 A1 Mar. 13, 2003

(30) Foreign Application Priority Data
 Mar. 30, 2000 (FR) .............................. 00 04040

(51) Int. Cl.[7] .................................. B65B 1/04
(52) U.S. Cl. .................. 141/351; 141/301; 141/367; 141/378
(58) Field of Search .................. 141/351–362, 141/301, 302, 305, 367, 378

(56) References Cited

U.S. PATENT DOCUMENTS

| 4,167,956 A | * | 9/1979 | Zahn ........................... 141/84 |
| 4,478,242 A | * | 10/1984 | Bond ........................... 137/383 |
| 5,687,777 A | * | 11/1997 | Dobson et al. ............... 141/18 |
| 5,722,638 A | * | 3/1998 | Miller et al. ............. 251/335.2 |

FOREIGN PATENT DOCUMENTS

| EP | 0476518 | * | 3/1992 |
| GB | 1258576 | * | 12/1971 |

* cited by examiner

Primary Examiner—Steven O. Douglas
(74) Attorney, Agent, or Firm—Linda K. Russell

(57) ABSTRACT

The invention concerns a valve assembly or an on-off pressure reducer device for a pressurised gas container designed to co-operate with a conditioning connection for filling said container. The valve assembly or on-off pressure reducer comprises a filler connection (14) with a longitudinal axis, a guide end (18), and a thread (22) axially offset relative to said end. The end (18) has a periphery (20) provided with at least an impression (40) protruding outside the periphery, projecting in a plane orthogonal to said longitudinal axis, the impression (40) of said connection end being secant to a circle centred on said axis and whereof the diameter is equal to the smaller of the internal and external diameters of said thread.

19 Claims, 4 Drawing Sheets

VALVE ASSEMBLY WITH OR WITHOUT INTEGRATED REDUCER FOR PRESSURIZED GAS CONTAINER

The subject of the present invention is a valve with or without integrated pressure reducer for pressurized-gas container and such a valve equipped with a conditioning connection for filling the container associated with the valve or with the integrated pressure-reducing valve.

Numerous cylinders intended to contain a gas under pressure are equipped with an integrated pressure-reducing valve. An integrated pressure-reducing valve consists in a single device which allows both the cylinder to be opened or closed and also the pressure at which the gas contained in the cylinder will be delivered to be adjusted. These integrated pressure-reducing valves comprise an inlet coupling with allows the container on which it is mounted to be filled using a conditioning connection connected to a source of said pressurized gas.

The attached FIGS. 1a and 1b depict an exemplary embodiment of the filling coupling and of the conditioning connection. FIG. 1a depicts the body 10 of the integrated pressure-reducing valve equipped with a tapped thread 12 to which the filling coupling 14 is fixed. The coupling 14 comprises a valve element 16 that shuts off the valve. The upper end 18 of this coupling defines a cylindrical lateral guide surface 20 the function of which will be explained later on. The assembly formed by the coupling and the pressure-reducing valve also comprises a screw thread 22 for the fixing of a conditioning connection 24 depicted in FIG. 1b. The conditioning connection 24 has the overall shape of a cylindrical sleeve 26 closed by off by an end 28 into which the flexible filling pipe 30 is fixed. Near its free end 32, the sleeve 25 has a tapped thread 34 to collaborate with the screw thread 22 of the pressure-reducing valve.

This assembly is very simple to use. The conditioning connection 24 is brought up opposite the filling coupling 14 then pushed around this coupling, guided by the surface 20. By turning the conditioning connection 24, the tapped thread 34 collaborates with the screw thread 22 to secure the conditioning connection to the filling coupling in a sealed way. Once this operation has been performed, the valve element 16 is opened, either under the effect of the pressure of the gas in the flexible pipe 30 or by a manual operation.

It should be added that the screw thread and the tapped thread 22 and 34 of the filling coupling and of the conditioning connection are standardized and correspond to the type of gas used.

It will be understood that it is desirable to make the unauthorized filling of compressed-gas cylinders impossible or difficult. The reason behind this is that these operations when performed by the inexperienced may prove hazardous and may also lead to contamination of the cylinder, for example if the gas introduced into the cylinder is not the same as the gas remaining therein or, as the case may be, if the filling operation is not performed with a minimum amount of precaution.

It will therefore be understood that there is a real interest in having cylinders intended to contain pressurized gas and which are equipped with valves with or without integrated pressure reducers, which can be filled only by the legitimate owner of the cylinder. In other words, the problem posed is that of preventing a gas cylinder or container from being filled by someone who is not authorized to do so, but without this in any way leading to complications in the cylinder-filling operation, as this would affect the productivity of the conditioning centers.

In order to achieve this goal according to the invention, the valve with or without integrated pressure reducer for a pressurized-gas container intended to collaborate with a conditioning connection to allow said container to be filled, comprises a filling coupling having a longitudinal axis, a guide end and a screw thread offset axially with respect to said end, said end having a contour equipped with at least one impression protruding from said contour, in projection in a plane orthogonal to said longitudinal axis, the impression of the end of said coupling being secant with a circle the diameter of which is equal to the smallest of the inside and outside diameters of said screw thread and centered on said axis.

It will be understood that, by virtue of the presence of the impression which constitutes a relief on the end of the cylinder filling coupling, it is impossible for the cylinder to be filled when it should not, using a conditioning connection of standard type. It will also be understood that the use of a conditioning connection having, for example, a screw thread of a larger diameter in order to get around the problem posed by the presence of the impression would not allow the conditioning connection to be secured to the pressure-reducing coupling.

Another object of the invention is to provide a valve with or without integrated pressure reducer for a pressurized-gas container equipped with a conditioning connection able to collaborate with said valve to allow said container to be filled, said valve comprising a filling coupling having a longitudinal axis, and a guide end and a screw thread offset axially with respect to said end, said end having a contour equipped with at least one impression projecting from said contour, said conditioning connection having an end equipped with a screw thread able to collaborate with the screw thread of said valve, the screw thread of said connection having at least one impression that is the mate of the impression of the end of said coupling, in projection in a plane orthogonal to said longitudinal axis, the impression of the end of said coupling being secant with a circle the diameter of which is equal to the smallest of the inside and outside diameters of the screw thread of said connection and centered on said axis, by means of which, for a given angular position about said longitudinal axis, said connection can be engaged around said coupling and the two screw threads can collaborate with one another.

Other features and advantages of the invention will become better apparent from reading, the description which follows'of several embodiments of the invention which are given by way of nonlimiting examples.

The description refers to the appended figures in which:

FIGS. 1a and 1b, already described, show, in vertical section, a conditioning coupling and a conditioning connection of standard type;

FIG. 2b is a view from above of the filling coupling of FIG. 2a;

FIG. 2c is a view in vertical section of a conditioning connection able to collaborate with the coupling of FIG. 2a;

FIG. 3b shows a conditioning connection able to collaborate with the coupling of FIG. 3a;

FIG. 4b is a view in horizontal section on the line B—B of FIG. 4a;

FIG. 4c is a view in vertical section of a conditioning connection able to collaborate with the filling coupling of FIG. 4a;

Figure 5A:
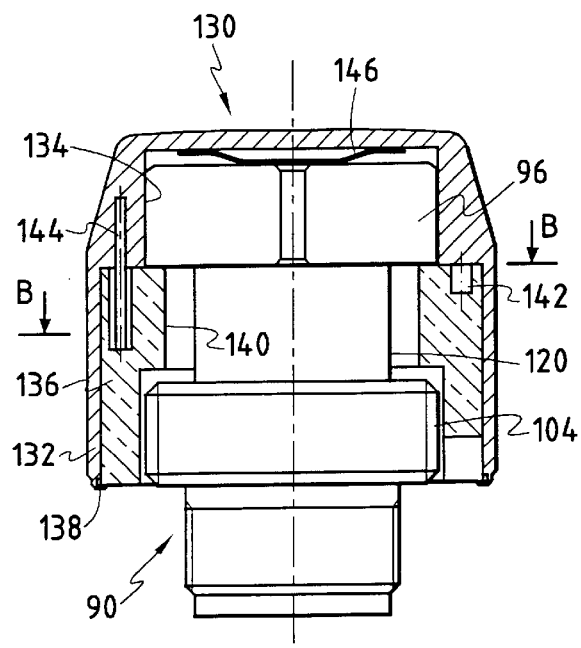
Figure 5B:
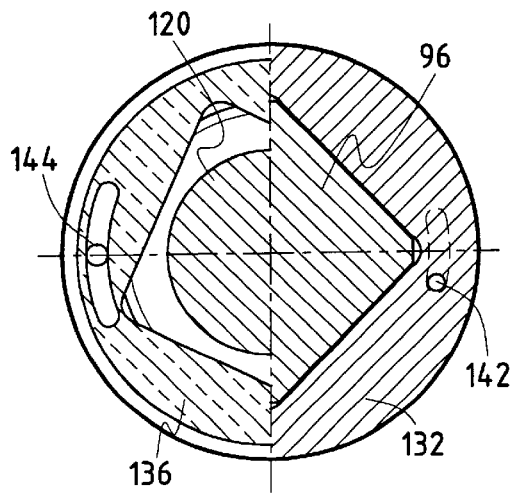
Figure 4A:
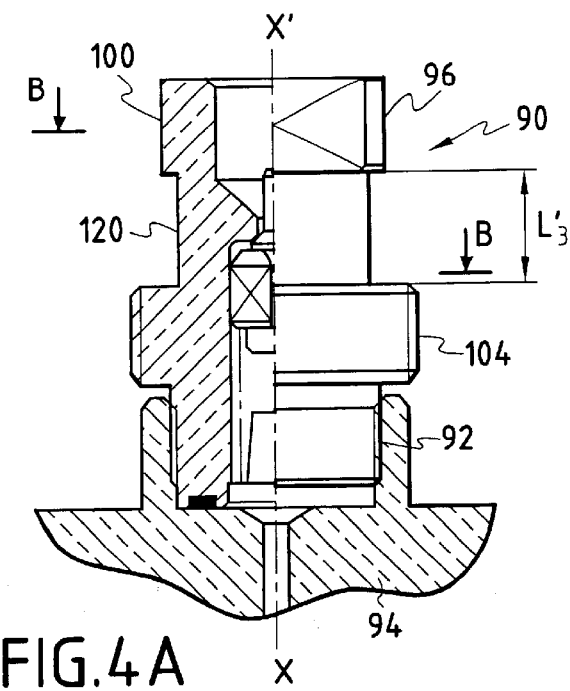
FIG. 4a shows, in vertical part section, a second embodiment of a male filling coupling according to the invention.
Figure 4B:
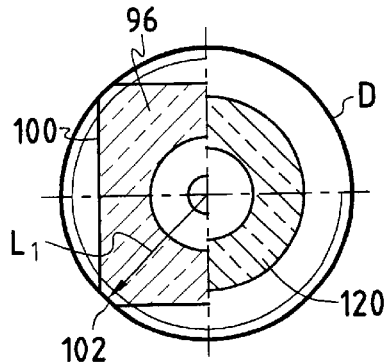
Figure 4C:
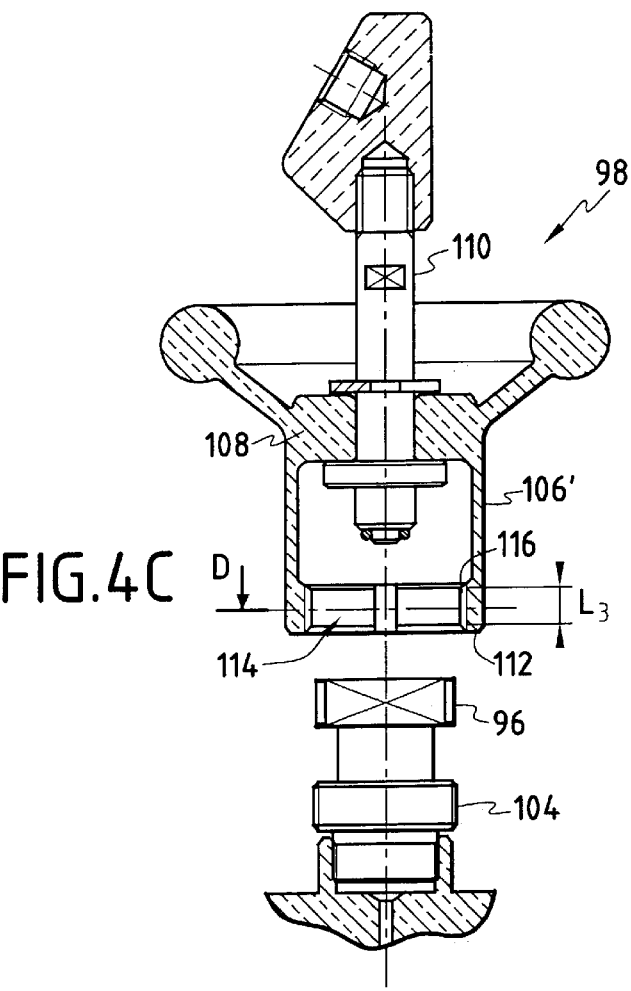
Figure 4D:
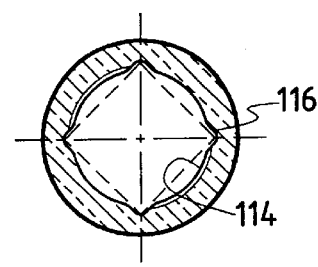
Figure 6A:
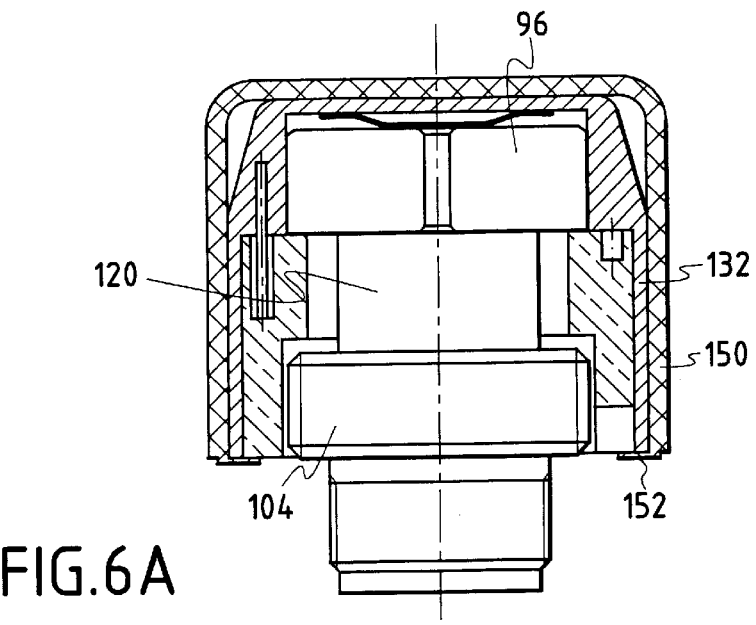
Figure 6B:
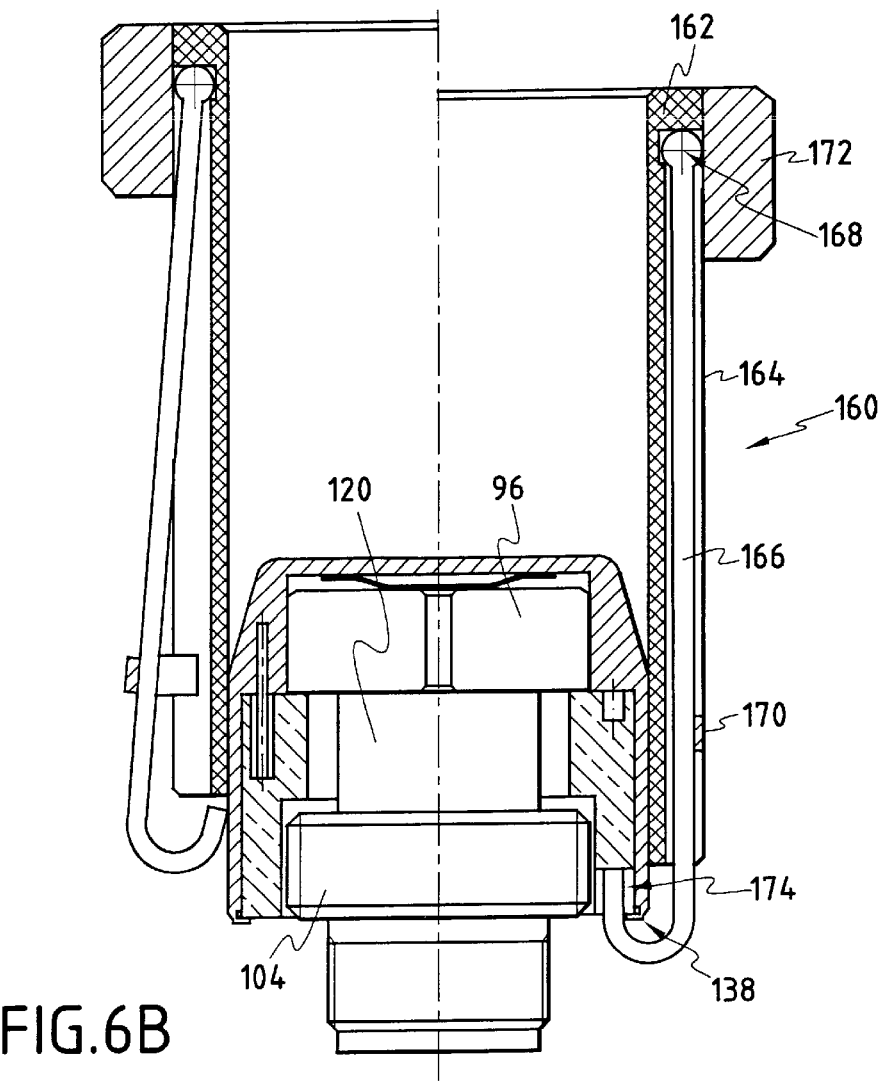

FIG. 4*d* is a view in section on the line D—D of the conditioning connection of FIG. 4*c*;

FIG. 5*a* shows a first embodiment of a safety stopper in vertical section for a filling coupling according to the invention;

FIG. 5*b* is a view in horizontal section on the line B—B of FIG. 5*a*;

FIG. 6*a* is a view in vertical section of a second embodiment of a stopper for a filling coupling; and FIG. 6*b* is a view in vertical part section of a tool for removing the stopper of FIG. 6*a*.

As has already been explained, the principle of the invention consists in providing, at the guide end of the filling coupling, at least one relief which projects internally or externally with respect to the contour of this end to prevent the cylinder or, more generally, the container, from being filled using a standard conditioning connection, it being possible for such filling to be obtained only using a specifically designed conditioning connection likewise comprising a mating relief which will of course be an inward one.

Figure 1A:
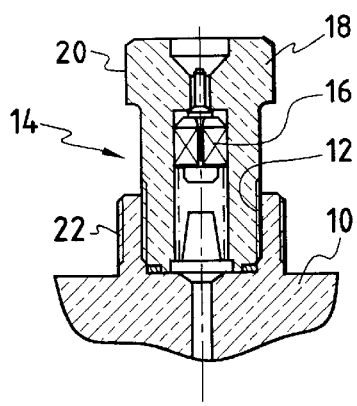
Figure 1B:
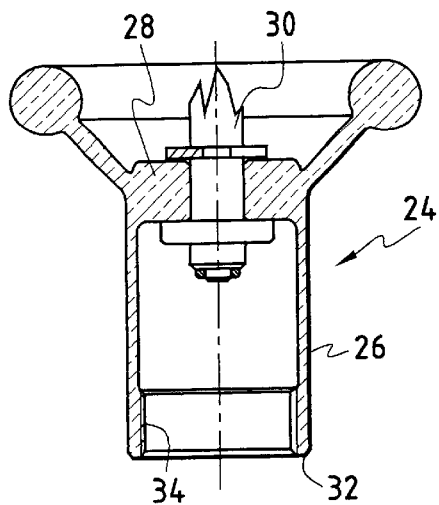
Figure 2A:
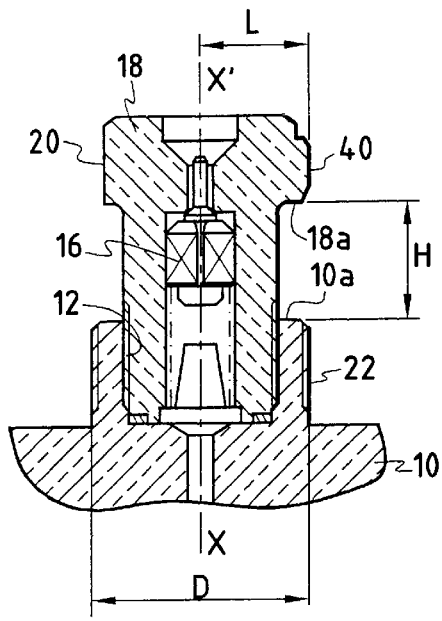
FIG. 2a shows, in vertical section, a filling coupling according to the invention according to a first embodiment.
Figure 2C:
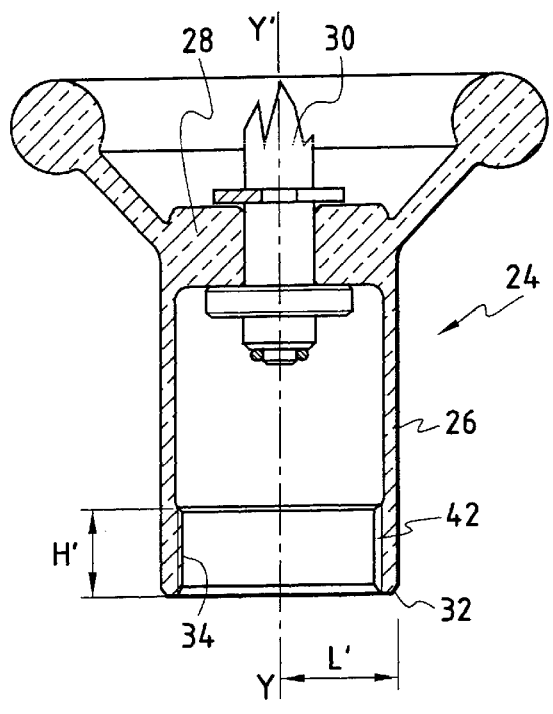
Figure 2B:
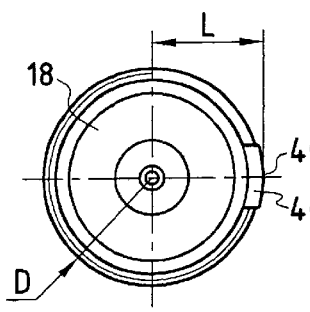

Referring first of all to FIGS. 2*a* to 2*c*, a first exemplary embodiment of the invention applied to the case of the filling coupling and the conditioning connection of FIGS. 1*a* and 1*b* will be described.

According to this embodiment, the end 18 of the filling coupling has a relief 40 which projects from the lateral wall 20 of this end over a limited arc of a circle. The distance between the axis X and X' of the coupling and the outer edge 40*a* of the relief 40 is equal to L. This length L is slightly greater than the outside radius D/2 of the external screw thread 22 of the integrated pressure-reducing valve body.

As FIG. 2*c* shows, the tapped thread 34 produced at the end of the conditioning connection 24 is provided with a notch 42 corresponding to the shape of the relief 40. More specifically, the distance between the axis Y-Y' of the coupling connection 22 and the bottom of the notch 42 which is termed L' is very slightly greater than the distance L. Furthermore, the length H' of the screw thread 22 of the conditioning connection is shorter than the length H which separates the lower shoulder 18*a* of the end 18 of the filling coupling from the upper face 10*a* of the body 2 of the pressure-reducing valve.

To fit the conditioning connection 24 onto the filling coupling 14, the open end of the connection 24 is offered up opposite the end 18 of the coupling. Of course, the connection 24 has to be orientated angularly so that the recess 42 coincides with the relief 40. In this position, all that is required is for the connection to be lowered with respect to the coupling and for the connection to be screwed onto the screw thread 22. This operation can be performed because the length H' of the tapped thread of the connection is shorter than the length H of the coupling below its end 18.

In the example described previously, just one relief 40 projecting out of the end 18 of the filling coupling was provided. It will be understood that several of these could be provided, the conditioning connection itself being equipped at its tapped thread 32 with corresponding recesses. Special combinations of reliefs and recesses may constitute a form of coding of the pressure-reducing valve and therefore of the cylinder, the conditioning connection having of course to conform to the coding corresponding, for example, to different kinds of compressed gas contained in the associated cylinders.

It will also be understood that, unlike with a conditioning connection 24 of the type depicted in FIG. 1*b*, it will be impossible to couple the conditioning connection to the filling coupling and therefore to fill the cylinder on which the integrated pressure-reducing valve is mounted.

Figure 3A:
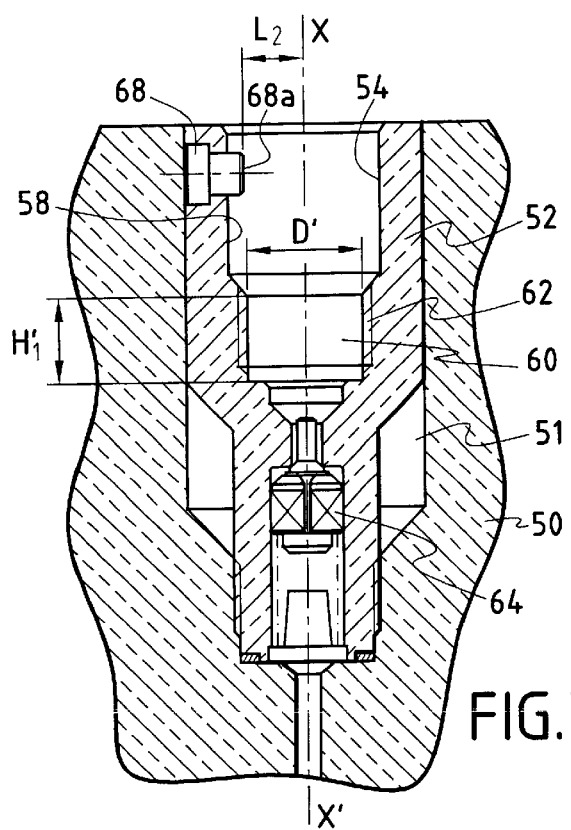
FIG. 3a is a view in vertical section of a conditioning coupling of female type according to the invention.
Figure 3B:
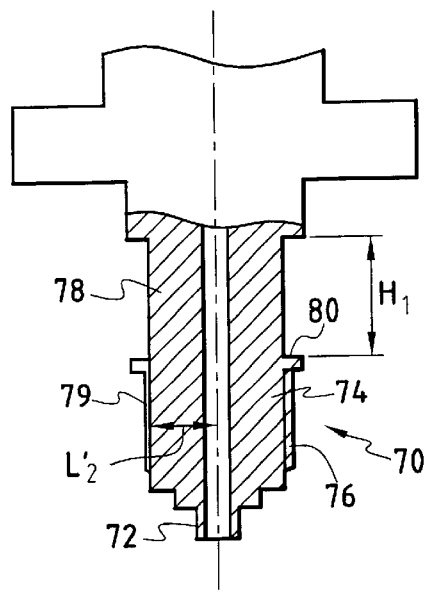

Referring now to FIGS. 3*a* and 3*b*, one embodiment of the invention will now be described for the case in which the filling coupling is of the female type. FIG. 3*a* depicts part of the body 50 of the integrated pressure-reducing valve in the bore 51 of which the female filling coupling 52 is mounted. This coupling 52 essentially comprises a recess of axis X-X' reference 54 comprising a guiding upper part 58 and a lower part 60 equipped with a tapped thread 62. The filling coupling 52 of course comprises a valve element 64.

A peg 68 is fixed in the wall of the part 58 of the recess 54. This peg 68 constitutes the impression within the meaning of the present invention. The distance $L_2$ between the end 68*a* of the peg 68 and the axis X-X' of the coupling is less than or equal to the outside radius D'/2 of the filtering 62.

FIG. 3*b* shows an exemplary embodiment of a conditioning connection 70 tailored to the filling coupling of FIG. 3*a*. This connection comprises an end 72 to act on the valve element 64 of the coupling, a first cylindrical part 74, the diameter of which corresponds to that of the lower part 60 of the recess 54 of the coupling and which is equipped with a screw thread 76 to collaborate with the tapped thread 62 of the coupling and a second cylindrical part 78, the diameter of which corresponds to that of the upper part 58 of the recess of the coupling. The screw thread 76 of the connection comprises a longitudinal slot 79 of which the dimensions, in cross section on a plane orthogonal to the axis Y-Y' of the connection, are the mate of those of the peg 68. The second cylindrical part 78 of the connection comprises an annular groove 80 into which the upper end of the slot 79 opens. The axial length $H_1$ of the groove 80 is at least equal to the length $H'_1$ of the tapped thread 62 of the coupling and the distance '2 between the bottom of the slot 79 and the axis Y-Y' of the connection is slightly shorter than the distance L2 between the face 68*a* of the peg 68 and the axis X-X' of the coupling.

The use of the conditioning connection 70 with the filling coupling of FIG. 3*a* is clearly evident from the foregoing description. The connection needs to be offered up facing the recess 54 of the coupling in such a way that the slot 79 of the connection coincides angularly with the peg 68. The connection 70 can then be engaged in the recess 54 of the coupling and the connection can be screwed onto the tapped thread 62 of the coupling by virtue of the presence of the annular groove 80 which allows the connection to turn freely with respect to the coupling.

A second embodiment of integrated pressure-reducing valve comprising a male filling coupling will now be described with reference to FIGS. 4*a* to 4*d*.

The coupling 90 comprises a screw thread 92 for fixing onto the pressure-reducing valve body 94. This coupling also comprises a guide end 96 for the conditioning connection 98 depicted in FIG. 4*c*. As shown better in FIG. 4*b*, the side wall 100 of the guide end 96 has a roughly square shape, the corners 102 of which are chamfered. These corners form the impressions of the coupling within the meaning of the present invention. The coupling 90 also comprises a screw thread 104 for the fixing of the conditioning connection 98. The screw thread 104 has an outside diameter D/2, and the distance between the axis X-X' of the coupling and the chamfered corners of the periphery of the end 96 is equal to L1. This distance L1 is at least equal to the radius D/2 of the screw thread 104. It will be understood that the square shape of the side wall of the end 96 constitutes reliefs or impressions similar to those described in conjunction with the first two embodiments. There are therefore four of these reliefs in this particular instance.

FIG. 4c depicts the conditioning connection 98 which has a sleeve 106 with an end wall 108 into which the coupling 110 of the filling pipe opens. At its free end 112 the sleeve 106 is equipped with a tapped thread 114 able to collaborate with the screw thread 104 of the coupling 90. As shown better in FIG. 4d, the tapped thread 114 has four recesses such as 116 arranged at 90° C. from one another and corresponding to the chamfered corners 102 of the side wall of the guide end 96 of the coupling 90. It will be understood that, by offering the conditioning connection 98 up opposite the end 96 of the filling coupling with an appropriate angular orientation, the recesses 116 allow the conditioning connection to be engaged with the filling coupling 90. As in the case of the previous embodiments, the axial length $L_3$ of the tapped thread 112 is greater than the length $L'_3$ corresponding to the cylindrical portion 120 of the coupling 90 which separates the guide end 96 of this coupling from the screw thread 104.

In order to further improve safety in the use of the cylinders equipped with pressure-reducing valves according to the invention, it is possible to envision safety stoppers to cover the filling coupling and make it more difficult for unauthorized users to access it.

FIGS. 5a and 5b describe a first embodiment of such a stopper.

In FIGS. 5a and 5b the stopper 130 is tailored to a filling coupling 90 of the type already described in conjunction with FIG. 4a. The stopper 130 consists of a cylindrical body 132 in which there is a square female impression 134 corresponding to the shape of the end part 96 of the coupling 90. A rotary ring 136 is mounted to rotate freely in the body 132 and held in place in terms of translation by a crimping 138. The ring 136 also has a female square impression 140 corresponding to the shape of the end 96 of the filling coupling.

The rotation of this ring 136 with respect to the body 132 is limited to 20° by virtue of an angular stop system embodied by an aperture 140 machined in the ring 136 accommodating a pin 142 connected to the body 132. This rotation allows the stopper to be placed in one of the following two states:

a locked state in which the two squares are angularly offset; and an unlocked state when the two squares coincide.

A spring 144 allows the stopper to be kept in the locked state.

The stopper 130 can be mounted on the filling coupling without any special tooling. The female square impression 140 of the ring needs to be offered up to face the square 96 of the filling coupling. Once this operation has been accomplished, the stopper has to be pushed down while at the same time turning it so as to overcome the force of the spring 144 and reach the unlocked state. Once the square 96 of the filling coupling is in the square housing 134 of the stopper body, the spring 144 can return the ring 130 to state 1 (the stopper is mounted and locked).

A seal 146 of the bellows type, bonded into the bottom of the body of the stopper 130 bears against the top of the filling coupling. It has the function of preventing the ingress of dust, water, moisture, etc. into the well of the valve element of the filling coupling. If the valve element of the filling coupling leaks, the bellows seal 146 deforms and allows the overpressure to discharge toward the ambient surroundings.

In the above configuration, once mounted, the stopper is connected in terms of rotation to the filling coupling. This non-freedom in terms of rotation may induce someone to force it with a tool (mole grips or water pump pliers), which would lead to external damage to the stopper, but in no case will the tool, whatever tool is used, be able to transmit enough torque to unscrew the filling coupling.

To avoid this inconvenience, FIG. 6a shows an alternative form in which the stopper of the filling coupling is free to turn. The body 132 of the stopper is enveloped in a plastic cap 150 crimped at 152 and which, by friction, is supposed to turn the body to fit it on the filling coupling. Once mounted on the filling coupling, this cap 150 is free to turn and turns freely if forced.

The stopper can be extracted only with a special tool 160 depicted in FIG. 6b. The use of the tool is very simple and can be done with one hand.

The body 162 of the stopper extracting tool is in the form of a tube the inside diameter of which is a sliding fit on the outside diameter of the body 132 of the stopper. The body of the tool has a vertical slot 164 in which a retractable hook 166 can be housed. This hook can turn about a ball-joint axis 168 so as to be able to retract as the tool is fitted on the stopper that is to be extracted. An elastic ring 170 allows the retractable hook 166 to be brought permanently into the work configuration. A collar 172 on the one hand traps the axis 168 of the hook 166 in its housing and, on the other hand, allows the removal tool to be manipulated. This collar 172 is forcibly mounted on the body 162 of the tool.

To remove the stopper from the filling coupling, all that is required is for the tubular body 162 of the extraction tool to be slipped around the stopper. During this operation, to make it easier for the tool to be passed, the hook 166 is retracted. Once the end of the hook 166 has protruded beyond the bottom of the stopper corresponding to the crimping 138, the elastic ring 170 causes it to return to its work position (in this position, the tool 160 is mounted on the stopper that is to be removed). To begin extraction, it is necessary first of all to move the tool up by turning it in such a way that the hook 166 finds one of the housings 142 provided in the lower edge of the ring of the stopper. Once this operation has been completed, the tool needs to be turned to combat the force of the spring 144 of the stopper so as to turn the stopper into the unlocked state. Once the stopper is unlocked, all that remains is for it to be removed by pulling the tool upward. To retrieve the stopper 9, all that remains is for it to be expelled from the tubular body of the tool 160 via the opposite side to the hook 166.

What is claimed is:

1. An integrated pressure reducing valve for a pressurized-fluid container intended to collaborate with a conditioning connection (24, 70, 98) to allow said container to be filled, comprising:

a filling coupling (14, 52, 90) having a longitudinal axis, a guide end (18, 58, 96) and a screw thread (22, 62, 104) offset axially with respect to said end, said end having a contour equipped with at least one impression (40, 68, 102) protruding from said contour, in projection in a plane orthogonal to said longitudinal axis, the impression of the end of said coupling being secant with a circle centered on said axis and the diameter of which is equal to the smallest of the inside and outside diameters of said screw thread.

2. A valve for a pressurized-fluid container intended to collaborate with a conditioning connection (24, 70, 98) to allow said container to be filled, comprising:

a filling coupling (14, 52, 90) having a longitudinal axis, a guide end (18, 58, 96) and a screw thread (22, 62, 104) offset axially with respect to said end, said end having a contour equipped with at least one impression (40, 68, 102) protruding from said contour, in projection in a plane orthogonal to said longitudinal axis, the impression of the end of said coupling being secant with a circle centered on said axis and the diameter of which is equal to the smallest of the inside and outside diameters of said screw thread.

3. An integrated pressure-reducing valve for a pressurized-gas container equipped with a conditioning connection (24, 70, 98) able to collaborate with said valve to allow said container to be filled, said valve comprising a filling coupling (14, 52, 90) having a longitudinal axis, and a guide end (18, 58, 96) and a screw thread (22, 62, 104) offset axially with respect to said end, said end having a contour equipped with at least one impression (40, 68, 102) projecting from said contour, said conditioning connection having an end equipped with a screw thread (34, 76, 114) able to collaborate with the screw thread of said valve, the screw thread of said connection having at least one impression (42, 79, 116) that is the mate of the impression of the end of said coupling, in projection in a plane orthogonal to said longitudinal axis the impression of the end of said coupling being secant with a circle centered on said axis and the diameter of which is equal to the smallest of the inside and outside diameters of the screw thread of said connection, by means of which, for a given angular position about said longitudinal axis, said connection can be engaged around said coupling and the two screw threads can collaborate with one another.

4. The valve as claimed in claim 3, wherein the axial distance between the impression (40, 68, 102) of the end of said coupling and the screw thread (22, 62, 104) of said valve is greater than the axial length of the screw thread (34, 76, 114) of said connection.

5. The valve as claimed in claim 3, wherein said coupling (14, 90) is male and in that the screw thread of the valve is an external screw thread (22, 104) and the screw thread of said connection is a tapped thread (34, 114), in that said impression (40, 102) of the end of the coupling protrudes from said contour and in that the impression (42, 116) of said coupling is a recess formed in the tapped thread (34, 114) of said connection.

6. The valve as claimed in claim 4, wherein said coupling (14, 90) is male and in that the screw thread of the valve is an external screw thread (22, 104) and the screw thread of said connection is a tapped thread (34, 114), in that said impression (40, 102) of the end of the coupling protrudes from said contour and in that the impression (42, 116) of said coupling is a recess formed in the tapped thread (34, 114) of said connection.

7. The valve as claimed in claim 3, wherein said coupling (52) is female, in that the screw thread of the valve is a tapped thread (62) and the screw thread of the connection is an external screw thread (76), in that the impression (68) of the end of the coupling protrudes into the contour of the end of the coupling and in that the impression of said connection is a recess (79) in the external screw thread of said connection.

8. The valve as claimed in claim 4, wherein said coupling (52) is female, in that the screw thread of the valve is a tapped thread (62) and the screw thread of the connection is an external screw thread (76), in that the impression (68) of the end of the coupling protrudes into the contour of the end of the coupling and in that the impression of said connection is a recess (79) in the external screw thread of said connection.

9. The valve as claimed in claim 1, wherein said valve comprises a number of impressions.

10. The valve as claimed in claim 2, wherein said valve comprises a number of impressions.

11. The valve as claimed in claim 3, wherein said valve comprises a number of impressions.

12. The valve as claimed in claim 4, wherein said valve comprises a number of impressions.

13. The valve as claimed in claim 5, wherein said valve comprises a number of impressions.

14. The valve as claimed in claim 6, wherein said valve comprises a number of impressions.

15. A conditioning connection (24, 70, 98) able to collaborate with a valve or a valve with integrated pressure reducer as claimed in claim 1 to allow said container to be filled, said conditioning connection having an end equipped with a screw thread (34, 76, 114) able to collaborate with the screw thread of said valve, the screw thread of said connection having at least one impression (42, 79, 116) that is the mate of the impression of the end of said coupling, in projection in a plane orthogonal to said longitudinal axis the impression of the end of said coupling being secant with a circle centered on said axis and the diameter of which is equal to the smallest of the inside and outside diameters of the screw thread of said connection, by means of which, for a given angular position about said longitudinal axis, said connection can be engaged around said coupling and the two screw threads can collaborate with one another.

16. A conditioning connection (24, 70, 98) able to collaborate with a valve or a valve with integrated pressure reducer as claimed in claim 2 to allow said container to be filled, said conditioning connection having an end equipped with a screw thread (34, 76, 114) able to collaborate with the screw thread of said valve, the screw thread of said connection having at least one impression (42, 79, 116) that is the mate of the impression of the end of said coupling, in projection in a plane orthogonal to said longitudinal axis the impression of the end of said coupling being secant with a circle centered on said axis and the diameter of which is equal to the smallest of the inside and outside diameters of the screw thread of said connection, by means of which, for a given angular position about said longitudinal axis, said connection can be engaged around said coupling and the two screw threads can collaborate with one another.

17. A cylinder of pressurized fluid which is equipped with an integrated pressure-reducing valve as claimed in claim 1.

18. A cylinder of pressurized fluid which is equipped with a valve as claimed in claim 2.

19. The use of a gas cylinder as claimed in claim 1 in a welding, cutting or heat treatment operation.

* * * * *